(12) United States Patent
Lyukshin et al.

(10) Patent No.: US 11,399,036 B2
(45) Date of Patent: Jul. 26, 2022

(54) SYSTEMS AND METHODS FOR CORRELATING EVENTS TO DETECT AN INFORMATION SECURITY INCIDENT

(71) Applicant: AO Kaspersky Lab, Moscow (RU)

(72) Inventors: Ivan S. Lyukshin, Moscow (RU);
Andrey A. Kiryukhin, Moscow (RU);
Dmitry S. Lukiyan, Moscow (RU);
Pavel V. Filonov, Moscow (RU)

(73) Assignee: AO Kaspersky Lab, Moscow (RU)

( * ) Notice: Subject to any disclaimer, the term of this patent is extended or adjusted under 35 U.S.C. 154(b) by 320 days.

(21) Appl. No.: 16/832,470

(22) Filed: Mar. 27, 2020

(65) Prior Publication Data

US 2021/0021613 A1    Jan. 21, 2021

(30) Foreign Application Priority Data

Jul. 17, 2019    (RU) .......................... RU2019122431

(51) Int. Cl.
*H04L 9/40* (2022.01)
(52) U.S. Cl.
CPC .............................. *H04L 63/1416* (2013.01)
(58) Field of Classification Search
CPC ................................................. H04L 63/1416
USPC ........................................................... 726/23
See application file for complete search history.

(56) References Cited

U.S. PATENT DOCUMENTS

| | | | |
|---|---|---|---|
| 6,906,709 B1 * | 6/2005 | Larkin | H04L 63/1433 345/419 |
| 8,024,804 B2 | 9/2011 | Shulman et al. | |
| 9,235,629 B1 | 1/2016 | Jones et al. | |
| 10,621,551 B2 * | 4/2020 | Nishimura | G06Q 10/103 |
| 2002/0078381 A1 | 6/2002 | Farley et al. | |

(Continued)

FOREIGN PATENT DOCUMENTS

| | | | | |
|---|---|---|---|---|
| CA | 2629723 A1 * | 5/2007 | ......... | H04L 63/1416 |
| CA | 3001282 C * | 6/2020 | ............ | G06F 21/52 |

(Continued)

OTHER PUBLICATIONS

Molina et al., "Event-Driven Architecture for Intrusion Detection Systems Based on Patterns", IEEE, doi: 10.1109/SECURWARE .2008.49, 2008, pp. 391-396. (Year: 2008).*

(Continued)

*Primary Examiner* — Peter C Shaw
(74) *Attorney, Agent, or Firm* — ArentFox Schiff LLP; Michael Fainberg

(57) ABSTRACT

Disclosed herein are systems and method for correlating events to detect an information security incident, a correlation module may receive a plurality of network events indicating potential security violations, wherein each network event of the plurality of network events has a respective timestamp. The correlation module may identify, from the plurality of network events, a subset of network events that have occurred within a period of time, based on each respective timestamp. The correlation module may determine a plurality of potential orders of occurrence for the subset of network events. The correlation module may apply at least one correlation rule to each respective potential order of the plurality of potential orders. In response to determining that the at least one correlation rule is fulfilled, the correlation module may detect the information security incident.

17 Claims, 8 Drawing Sheets

(56) References Cited

U.S. PATENT DOCUMENTS

| | | | |
|---|---|---|---|
| 2005/0060562 A1 | | 3/2005 | Bhattacharya et al. |
| 2005/0289219 A1* | | 12/2005 | Nazzal ................ H04L 63/1408 |
| | | | 709/203 |
| 2016/0350173 A1* | | 12/2016 | Ahad .................. G06F 11/0793 |
| 2017/0024484 A1* | | 1/2017 | Qiu .................... G06Q 30/0277 |

FOREIGN PATENT DOCUMENTS

| | | | | | |
|---|---|---|---|---|---|
| CN | 100409148 C | * | 8/2008 | ......... | H04L 63/1416 |
| CN | 107517216 A | * | 12/2017 | ......... | H04L 63/1441 |
| CN | 110686738 A | * | 1/2020 | ............ | G01F 15/003 |
| CN | 109327449 B | * | 10/2021 | ......... | H04L 63/1416 |
| EP | 3757706 A1 | * | 12/2020 | ....... | G01N 35/00623 |

OTHER PUBLICATIONS

Cermak et al., "Real-time Pattern Detection in IP Flow Data using Apache Spark," 2019 IFIP/IEEE Symposium on Integrated Network and Service Management (IM), 2019, pp. 521-526. (Year: 2019).*

Jiang et al., "Temporal and spatial distributed event correlation for network security", IEEE, doi: 10.23919/ACC.2004.1386701, 2004, pp. 996-1001 vol.2. (Year: 2004).*

Lin Guoyuan et al.: "Issue of Event Sequence in time of Distributed Intrusion Detection System", Network and Parallel Computing Workshops, 2007. NPC Workshops. IFIP International Conference ON, IEEE, Piscataway, NJ, USA, Sep. 18, 2007 (Sep. 18, 2007), pp. 215-222.

* cited by examiner

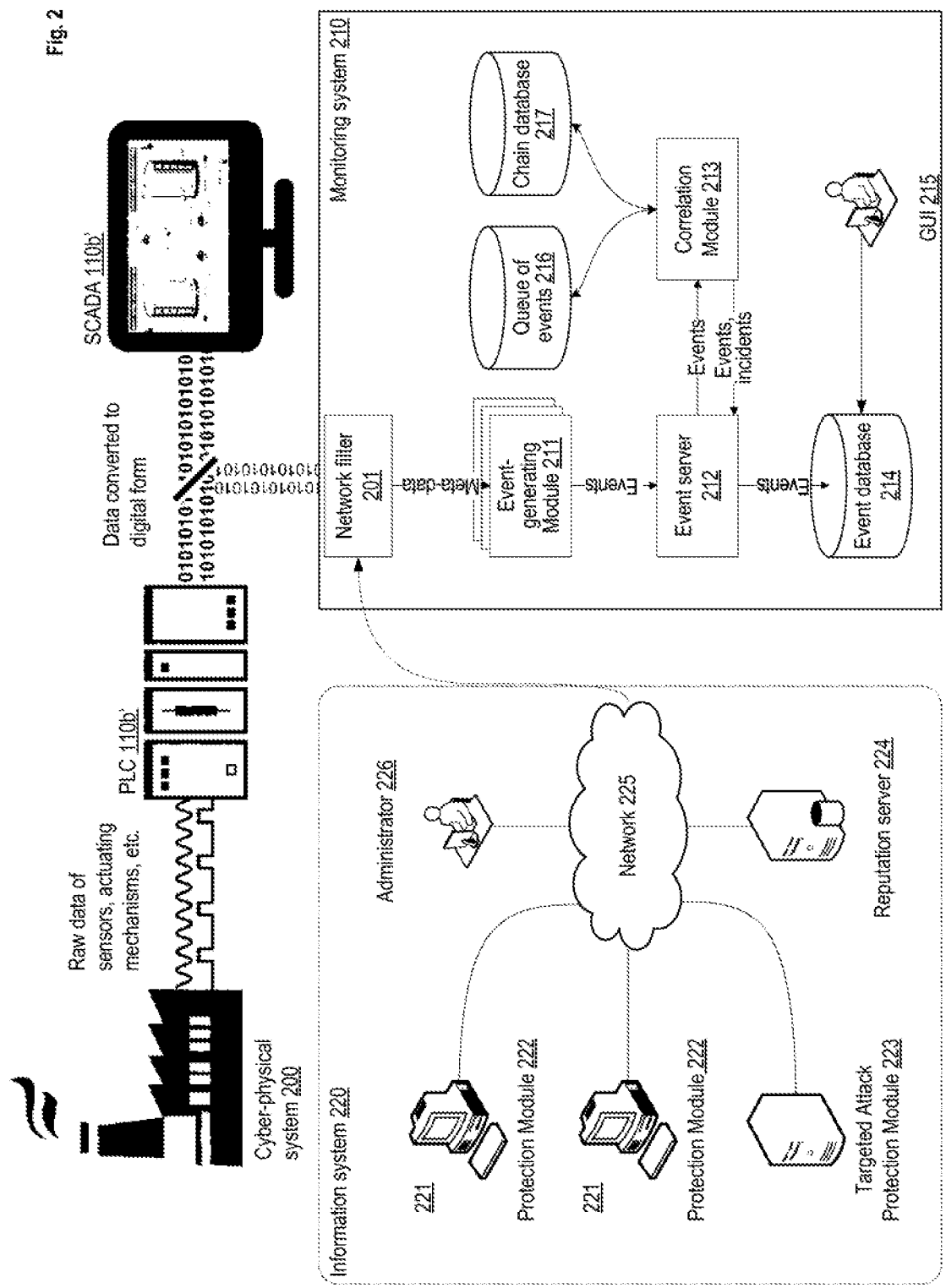

SYSTEMS AND METHODS FOR CORRELATING EVENTS TO DETECT AN INFORMATION SECURITY INCIDENT

CROSS-REFERENCE TO RELATED APPLICATION

This application claims benefit of priority under 35 U.S.C. 119(a)-(d) to a Russian Application No. 2019122431 filed on Jul. 17, 2019, which is incorporated by reference herein.

FIELD OF TECHNOLOGY

The present disclosure relates to the field of data security, and more specifically, to correlating events to detect an information security incident.

BACKGROUND

At present, besides traditional malicious software (such as viruses, Internet worms, key loggers, ransomware, and others), computer attacks such as targeted attacks (TAs) and complex attacks (e.g., Advanced Persistent Threats (APTs)) have become widespread on cyber-physical systems (CPS) and IT systems (i.e., corporate infrastructures). Hackers may have various goals—from the simple theft of personal data of the employees to industrial espionage. Hackers often possess information about the architectures of corporate networks, the principles of the internal document traffic, the protection means used for the networks and computer devices, or any other specific information for the cyber-physical or IT system. This information allows the hackers to get around the existing protection means, which often do not have the flexibility of settings to meet all the needs of the IT system.

The existing technologies for protection against malicious software and computer threats, such as: signature analysis, heuristic analysis, emulation, and others, have a number of shortcomings preventing them from providing the proper level of protection against computer attacks. For example, they do not make it possible to detect and track previously unknown threats, computer attacks without the use of malicious software, complex attacks (using technology to get around the protection means) and long-running attacks (from several days to several years), the features of which become known after a lengthy time.

For the protection of cyber-physical systems (CPS), Security information and event management (STEM) systems are being increasingly used. Such systems perform automated collection and processing of a large volume of information security (IS) events from a multitude of protection means and sensors of a network, installed on the computers of the users, the servers, the network equipment, and the controllers. STEM systems are able to detect computer attacks in the early stages, identify information security incidents, and alert the operator of the CPS for further investigation. To accomplish this, use is made of a correlation of information security events—the analysis of the interworking between different events according to specified rules (signatures) and the automatic creation of incidents upon triggering of the rules, which will then be displayed to the operator of the CPS for a detailed investigation. SIEMs make it possible to detect network attacks, virus epidemics, vulnerabilities, hacking and other types of computer attacks, as well as configuration errors of the network devices.

However, it often happens that several different IS events occur at the same time (with a given uncertainty). This may happen for various reasons. For example, the clocks on the sensors (the sources of the events) might not be synchronized. Furthermore, the events might occur in the same data packet, so that they might be assigned identical time stamps, even though the events occurred at different times. In yet another example, when receiving the events a delay might have occurred in the processing of the traffic by different modules. For these reasons, an information security incident might be overlooked, or a false positive may be produced.

Thus, the technical problem arises of a low level of detection of information security incidents in cyber-physical systems.

However, the technologies known from the prior art cannot solve this technical problem, since they are unable to increase the level of detection of information security incidents in cyber-physical systems (for example, when a series of events are obtained at the same time). Therefore, the need arises for a technology which can solve the stated technical problem, that is, a system and a method for correlating events to detect an information security incident.

SUMMARY

Aspects of the disclosure relate to the field of data security. In particular, aspects of the disclosure describe methods and systems for correlating events to detect an information security incident.

The technical result is to improve the level of detection of information security incidents in cyber-physical systems.

In an exemplary aspect for correlating events to detect an information security incident, a correlation module may receive (e.g., from an event-generating module) a plurality of network events indicating potential security violations, wherein each network event of the plurality of network events has a respective timestamp. The correlation module may identify, from the plurality of network events, a subset of network events that have occurred within a period of time, based on each respective timestamp. The correlation module may determine a plurality of potential orders of occurrence for the subset of network events (e.g., by determining all permutations of the events in the subset). The correlation module may apply at least one correlation rule to each respective potential order of the plurality of potential orders, wherein the at least one correlation rule comprises at least one network event order of occurrence associated with the information security incident. In response to determining that the at least one correlation rule is fulfilled, the correlation module may detect the information security incident.

In some aspects, a length of the period of time is less than a minimum amount of time between consecutive network events needed to determine an accurate order of occurrence of the consecutive network events.

In some aspects, the plurality of events are received from a plurality of source devices such that at least a first event of the plurality of events is received from a first source device of the plurality of source devices and at least a second event of the plurality of events is received from a second source device of the plurality of source devices.

In some aspects, a clock of the first source device is not synchronized with a clock of the second source device.

In some aspects, an event detection speed of the first source device is less than an event detection speed of the second source device.

In some aspects, the correlation module may determine that the at least one correlation rule is fulfilled by comparing the at least one network event order of occurrence to each respective potential order and determining, based on the comparing, a match between the at least one network event order of occurrence and at least one potential order.

In some aspects, the correlation module may not detect the information security incident, in response to determining that the at least one correlation rule is not fulfilled by any of the plurality of potential orders.

In some aspects, at least one order of occurrence is specified in accordance with a level of significance of each of the events whose time of creation is within the specified period of time, the level of significance being specified by the event-generating module.

In some aspects, said events are obtained at least from one of the event-generating module: a white list; an intrusion detection system; a detection and parsing module; a traffic analysis module; an asset management module.

In some aspects, a system is used which includes a correlation module and at least one event-generating module, said devices producing the correlation of events for the detecting of an information security incident according to the method of correlation of events.

In some aspects, a non-transitory computer readable medium storing thereon computer executable instructions for correlating events to detect an information security incident, comprises instructions for performing the method described above.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

FIG. 2 shows a block diagram of a system for correlating events to detect an information security incident, in accordance with aspects of the present disclosure.

DETAILED DESCRIPTION

Figure 1A:
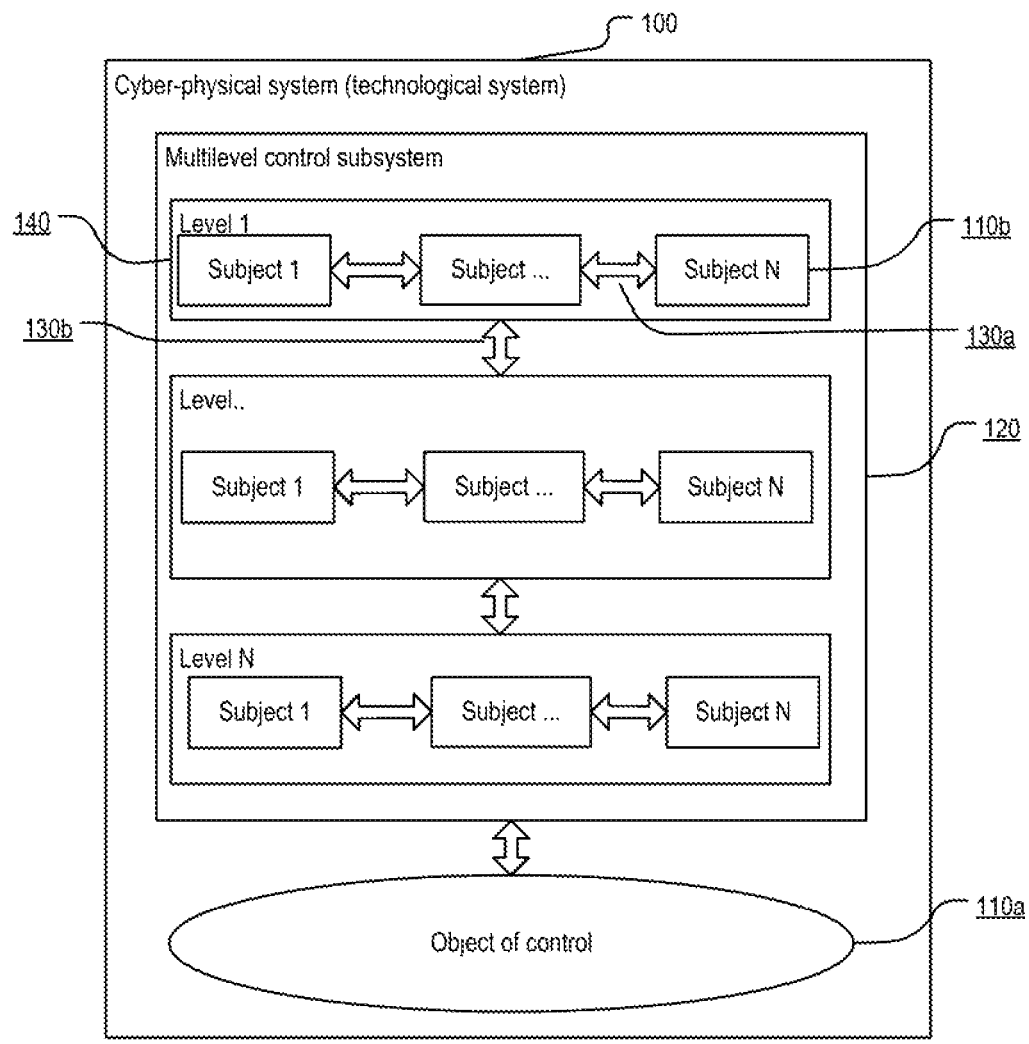
FIG. 1a shows a block diagram of a technological system (TS), in accordance with aspects of the present disclosure.

Exemplary aspects are described herein in the context of a system, method, and computer program product for correlating events to detect an information security incident. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

The following features will be used in describing the present disclosure:

Indicators of compromise, (IOC) (also referred to as indicators of infection) are artifacts or residual features of an intrusion in an IT system, observable on a computer or in a network. Typical indicators of compromise are antivirus records, IP addresses, check sums of files, URL addresses, domain names of command centers of botnets, and others. A number of standards exist for indicators of compromise, in particular: OpenIOC, Structured Threat Information Expression (STIX'), Cyber Observable Expression (CybOX™), etc.

An information security event (also referred to as network event or event in the present disclosure) in an IT security system is a detected state of a system or service or a state of a network indicating a possible violation of the IT security policy, a violation or failure of the means and measures of monitoring and control, or a previously unknown situation which may be significant to security.

A correlation is the analysis of the interworking between different events using given rules (signatures) of correlation.

A chain of events (hereafter, a chain) is a sequence of events combined into a common collection.

An information security incident (hereafter, an incident) is one or more unwanted or unexpected information security events which with a significant degree of probability result in a compromising of the operations of a business and create threats to information security. Incidents may also take part in the process of correlation, along with other events.

An object of control is a technological object subjected to external (controlling and/or perturbing) actions for the purpose of changing its state; in a particular instance, such objects are a device (such as an electric motor) or a technological process (or part thereof).

A technological process (TP) is a process of material production, consisting of a sequential changing of states of a material entity (the subject of work).

The control of a technological process (process control) is a set of methods used to control the process variables during the production of an end product.

A control loop consists of material entities and control functions needed for the automated regulating of the values of the measured process variables to the values of desired setpoints. A control loop contains detectors and sensors, controllers, and actuating mechanisms (actuators).

A process variable (PV) is a current metered value of a particular portion of a TP which is being observed or monitored. A process variable might be, for example, a measurement from a sensor.

A setpoint is a value of a process variable which is to be maintained.

A manipulated variable (MV) is a parameter which is regulated so that the value of a process variable is maintained at the setpoint level.

An external action is a method of changing the state of an element subjected to the action (such as an element of a technological system (TS)) in a particular direction, the action being transmitted from one element of the TS to another element of the TS in the form of a signal.

The state of an object of control is the totality of its essential attributes, as expressed by parameters of state which are altered or maintained under the influence of external actions, including control actions from a control subsystem.

A parameter of state is one or more numerical values characterizing an essential attribute of an object; in one particular instance, the parameter of state is a numerical value of a physical quantity.

A formal state of an object of control is the state of the object of control corresponding to the process chart and other technological documentation (in the case of a TP) or a timetable (in the case of a device).

A controlling action is a deliberate (the goal of the action is to act on the state of the object), legitimate (provided for by the TP) external action on the part of the control subjects of a control subsystem on an object of control, resulting in a change of state of the object of control or a maintaining of the state of the object of control.

A perturbing action is a deliberate or unintentional illegitimate (not provided for by the TP) external action on the state of an object of control, including an action on the part of the control subject.

The control subject is a device which applies a controlling action to an object of control or transmits a controlling action to another control subject for transformation before being applied directly to the object.

A multilevel control subsystem is a collection of control subjects that involves several levels.

A cyber-physical system is an IT concept meaning the integration of computing resources into physical processes. In such a system, the sensors, equipment, and IT systems are connected along the entire chain of value creation beyond the boundaries of a single enterprise or business. These systems interact with each other by means of standard Internet protocols for forecasting, self-tuning, and adapting to changes. Examples of a cyber-physical system are a technological system, the Internet of Things (including portable devices), and an industrial Internet of things.

The Internet of Things (IoT) is a computer network of physical objects ("things") equipped with built-in technologies for interacting with each other or with the outer world. The Internet of Things includes such technologies as portable devices, electronic systems of means of transportation, smart cars, smart cities, industrial systems, and others.

An industrial Internet of Things (IIoT) is a subcategory of the Internet of Things which also includes applications oriented to the consumer, such as portable devices, "smart home" technologies and cars with automatic control. A distinguishing feature of both concepts is devices with built-in sensors, machine tools and infrastructure sending data through the Internet and controlled by means of software.

A technological system (TS) is a functionally interrelated group of control subjects of a multilevel control subsystem and an object of control (a TP or a device), realizing through a change in state of the control subjects, a change in state of the object of control. The structure of the technological system is formed by the basic elements of the technological system (the interrelated control subjects of the multilevel control subsystem and the object of control), and also the links between these elements. In the event that the object of control in the technological system is a technological process, the end goal of the control is: by a change in the state of the object of control, to change the state of the work object (raw material, blanks, etc.). In the event that the object of control in the technological system is a device, the end goal of the control is to change the state of the device (a means of transportation, a spacecraft). The functional relationship of the elements of the TS means a relationship of the states of these elements. There might not even be a direct physical link between the elements, for example, a physical link between actuators and a technological operation is absent, yet the cutting speed for example is functionally related to the rotational speed of a spindle, even though these parameters of state are not physically connected.

The state of a control subject is the totality of its essential attributes, expressed by the parameters of state which can be altered or maintained under the influence of external actions.

The essential attributes (and accordingly the essential parameters of state) of a control subject are attributes having a direct influence on the essential attributes of the state of the object of control. The essential attributes of the object of control are attributes having a direct influence on the functional factors being controlled (precision, safety, efficacy) for the TS. For example, cutting conditions corresponding to formally specified conditions, the movement of a train corresponding to its itinerary, the maintaining of a reactor temperature within permissible ranges. Depending on the factors being controlled, the parameters of state of the object of control, and accordingly related parameters of state of the control subjects exerting a controlling action on the object of control are selected.

The state of an element of a technological system is the state of the control subject and the object of control.

The real state of an element of a technological system is the state of an element of a technological system at a certain time of action on the object of control, determined by measuring the parameters of state and intercepting signals (traffic) between the elements of the TS. The measurement of the parameters of state is performed for example with the aid of sensors installed in the TS.

The real state of a technological system is the totality of interrelated real states of the elements of the technological system.

A cybernetic block is an element of a cyber-physical monitoring system, monitoring the process of operation of an element of the technological system.

A state space is a method of formalizing a change in states of a dynamic system (a technological system or a cyber-physical system).

A computer attack (also a cyber-attack) is a targeted action on information systems and computer telecommunication networks by hardware and software, carried out in order to breach information security in these systems and networks (see the "Basic outline of government policy in the area of providing security for automated systems for controlling the production and technological processes of critically important infrastructure objects of the Russian Federation" (ratified by the President of the Russian Federation (RF) on 3 Feb. 2012, No. 803).

A directed attack (or a targeted attack, TA) is a particular instance of a computer attack, directed against a specific organization or a specific individual.

SIEM (Security Information and Event Management) systems are means designed to control the information security in organizations on the whole and to manage events obtained from various sources. SIEM systems are able to analyze events arriving from network devices and various applications in real time.

FIG. 1a schematically shows an example of a technological system (TS) comprising the elements 110a and 110b, where the elements of the TS are: the object of control 110a; the control subjects 110b, forming a multilevel control subsystem 120; horizontal links 130a and vertical links 130b. The control subjects 110b are grouped by levels 140.

Figure 1B:
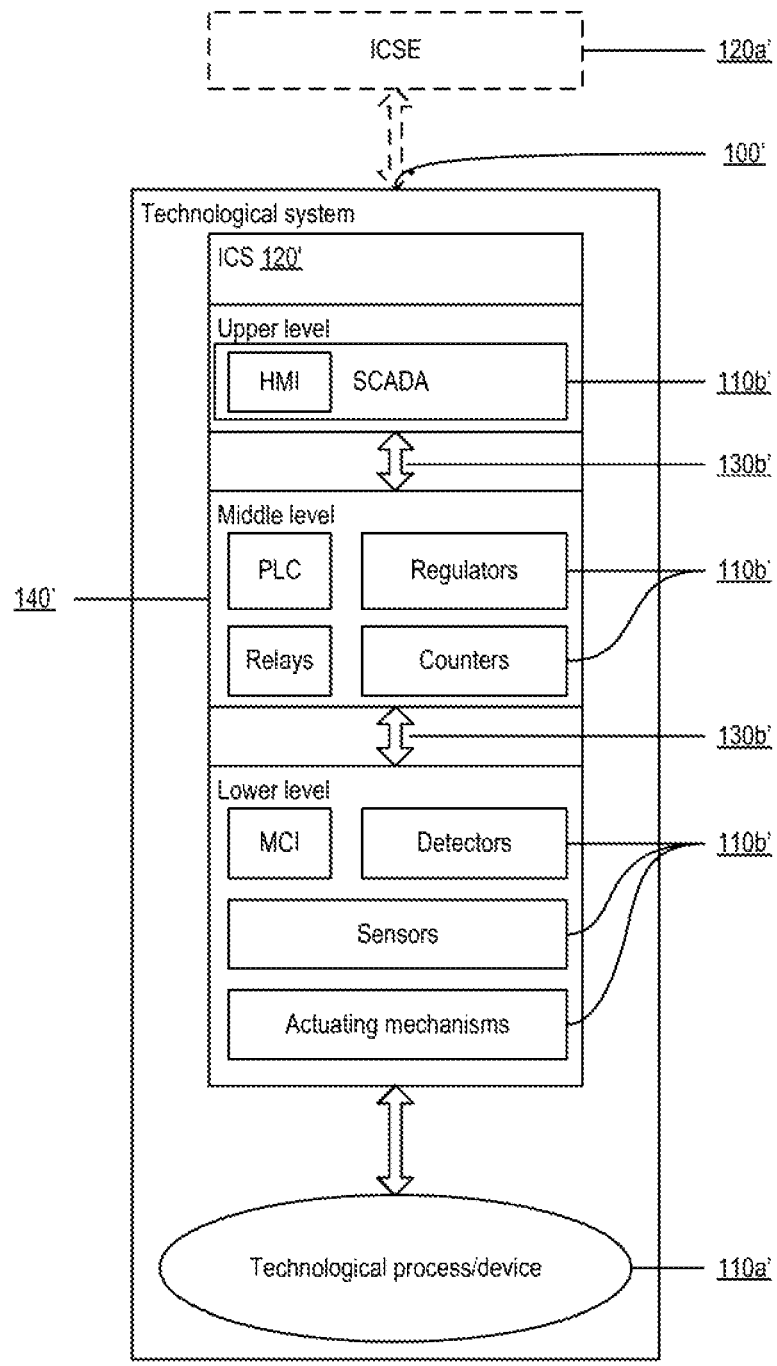
FIG. 1b shows a block diagram of an implementation of the technological system (TS), in accordance with aspects of the present disclosure.

FIG. 1b schematically shows a particular example of the implementation of a technological system 100'. The object of control 110a' is a TP or a device; the object of control 110a' is configured to control actions, which are elaborated and realized by an industrial control system (ICS) 120'; in the ICS, three levels 140' are distinguished, consisting of the control subjects 110b' interrelated to each other both on the horizontal by horizontal links (links within a level, not shown in the figure) and on the vertical by vertical links 130b' (links between levels). The relationships are functional, i.e., in the general case a change in state of a control subject 110b' on one level elicits a change in the states of the control subjects 110b' connected to it on the same level and on other levels. Information about the change in state of the control subject is transmitted in the form of a signal along the horizontal and vertical links established between the control subjects, i.e., information on the change in state of the particular control subject is an external action with respect to the other control subjects 110b'. The levels 140' in the ICS 120' are identified in accordance with the purpose of the control subjects 110b'. The number of levels may vary, depending on the complexity of the industrial control system 120'. Simple systems may contain one or more lower levels. For the physical linkage of the elements of the TS (110a, 110b) and the subsystems of the TS 100, wire networks, wireless networks and integrated microcircuits are used; for the logical linkage between the elements of the TS (110a, 110b) and the subsystems of the TS 100, Ethernet, industrial Ethernet and industrial networks are used. The industrial networks and the protocols used are of various types and standards: Profibus, FIP, ControlNet, Interbus-S, DeviceNet, P-NET, WorldFIP, LongWork, Modbus and others.

The upper level (the level of supervisory control and data acquisition, SCADA) is the level of dispatcher/operator control and includes at least the following control subjects 110b': controllers, control computers, means of protection installed on the control computers and human-machine interfaces (HMI) (shown in FIG. 1b within a single control subject SCADA). This level is designed to track the states of the elements of the TS (110a', 110b'), to obtain and compile information about the state of the elements of the TS (110a', 110b'), and to correct them if necessary.

The middle level (the CONTROL level) is the level of the controllers and includes at least the following control subjects: programmable logic controllers (PLC), counters, relays, regulators. The control subjects 110b' of PLC type receive information from the control subjects of "measurement and control equipment" type and from the control subjects 110b' of "sensor" type as to the state of the object of control 110a'. The control subjects of PLC type elaborate (create) a controlling action in accordance with a programmed control algorithm for the control subjects of "actuator" type. The actuators realize this directly (apply it to the object of control) at the lower level. An actuator is part of an actuating device (equipment). Regulators, such as PID regulators (proportional-integral-derivative controller or PID controller) are a device in a control loop with feedback.

The lower level (the Input/Output level) is the level of such control subjects as: sensors and detectors, measurement and control instruments (MCI) which monitor the state of the object of control 110a', and also actuators. The actuators act directly on the state of the object of control 110a', in order to bring it into compliance with a formal state, i.e., a state complying with a technological mission, a technological chart or some other technological documentation (in the case of a TP) or a timetable (in the case of a device). On this level, the signals from the control subjects 110b' of "sensor" type are coordinated with the inputs of the control subjects of the middle level, and the controlling actions elaborated by the control subjects 110b' of PLC type are coordinated with the control subjects 110b' of "actuator" type, which implement them. An actuator is part of an actuating device. An actuating device moves a regulating element in accordance with signals arriving from the regulator or a controlling device. Actuating devices are the last link in the chain of automatic control and in the general case consist of the units:

an amplifying device (contactor, frequency converter, amplifier, and so on);

an actuating mechanism (electric, pneumatic or hydraulic drive) with feedback elements (detectors of the position of an output shaft, a signaling of end positions, a manual drive, and so forth);

a regulating element (gates, valves, slides, and so forth).

Depending on the application conditions, actuating devices may differ in their design. The actuating mechanisms and regulating elements are usually among the basic units of the actuating devices.

In a particular example, the actuating device as a whole is known as the actuating mechanism.

The ICSE 120a' is an industrial control system of an enterprise.

FIG. 2 shows a diagram of the system of correlation to detect an information security incident. The cyber-physical system 200 is shown in a simplified variant. Examples of a cyber-physical system 200 are the above-described technological system 100 (see FIG. 1a-1b), the Internet of Things, an industrial Internet of Things. To be clear in the rest of the application, a TS shall be considered as the main example of the CPS 200. Unprocessed data of sensors, actuators and other subjects are converted by programmable logic controllers into digital form and sent through the computer network to the SCADA system 110b'. The network traffic is also mirrored (port mirroring, SPAN—Switched Port Analyzer) to a monitoring system 210. A network filter 201, located in the monitoring system 210, is configured for the processing of the received network traffic and the sending of the processed traffic to the event-generating module 211. The event-generating module 211 is configured for the generating of information security events and for sending them to an event server 212. The event-generating module 211 comprises a white list, an intrusion detection system (IDS), a detecting and parsing module, a traffic analysis module, a monitoring module, an asset management module, and others. The event-generating module 211 is shown more closely in FIG. 5.

The event server 212 saves the events in an event database 214 and sends the events to the correlation module 213. The correlation module 213 performs the correlation of the events using correlation rules, as a result of using which, it is possible to discover information security incidents (which are also events). The incidents are reported back to the event server 212 and saved in the event database 214. A graphical user interface (GUI) 215, which outputs information about the events and incidents to the operator of the correlation system 210, also has access to the event database 214. Furthermore, the correlation module 213 is connected to the queue of events 216 in which the correlation module 213 saves the events for later analysis, and also to a chain database 217, in which the correlation module 213 saves the chains of events.

The information security events contain, in particular, an event source, a time stamp, and a description of the event. Furthermore, in a particular exemplary embodiment, the IS events contain a level of significance of the event. The time stamp is the time of receiving the event, which may be defined as the time the network filter 201 receives the network packet containing the data used to define that event. The event source is the identifier of the event-generating module 211 which generated that event.

The correlation module 213 performs the correlation of events using correlation rules. The correlation rules contain conditions for use and actions. A condition of use defines the events (a chain of events) which fulfill the correlation rule for the taking of actions by the correlation module 213. The actions are, in particular, the creation of an information security incident. Furthermore, actions may be, for example, the creation of a new chain of events and the adding of an event to an existing chain of events. The chains of events are saved in the chain database 217.

As an exemplary embodiment and for the ease of further exposition, correlation rules are considered which are realized in the form of a finite state machine, describing the transitions between nodes (also known as states) of the chains of events. The correlation rules may be described, for example, using the markup language YAML.

A correlation rule consists of the name of the rule and a list of transitions (transactions) between nodes. Furthermore, a correlation rule may contain the maximum allowable number of events for the chain of events (max_events).

In YAML markup language, a correlation rule may be written as follows:

```
rule:
    name: "Rule 1"
    max_events: 100
    transactions:
        - transaction: { ... }
```

The list of transitions (transactions) is described as follows:
1. The name of the node from which the transition occurs (from).
2. The name of the node to which the transition occurs (to).
3. The predicate—a declarative set of conditions for the transition of the chain from the node from to the node to.
4. The action—an optional declarative set of actions to be performed in case of the transition.
5. A statement that the transition may be delayed for a certain time and/or number of arriving events (delay, delay_count).

A node of the chain is used to denote the start (<start>) and end (<end>) of the correlation rule, and also to denote the location:

```
transition:
    from: <start>
    to: <end>
    predicate:
        - event: 1
    action:
        - store_attr:
            var: event.type
            name: type
```

The predicate of a chain transition contains the condition for the transition from one node to the following node. The condition of the transition may be a compound condition made up of several conditions.

For example, the predicate shown below contains a condition of transition which is fulfilled upon arrival of the event No. 1000 and provided that the IP address of the event source (event.src_address.ip) agrees with a given IP address ($my_ip):

```
predicate:
    - event: 1000
        - equal: { var: event.src_address.ip, expect: $my_ip }
```

Thus, the transition occurs only upon fulfillment of the condition of the predicate. For the transition to the end of the rule (the node <end>), actions will be performed as indicated in the rule (for example, an IS incident is created). The transition of the chain of events from one node to another node performs a series of actions: determination of the current position of the chain, adding of an event to the chain, delaying the transition for a given time and/or number of arriving events. The actions, in particular, may be the following:

store_attr—the saving of event attributes by the correlation module 213.

ttl—a timeout, during which the correlation module 213 waits for a new event for adding to the chain. Upon expiration of the time ttl, the chain will be destroyed by the correlation module 213.

fire_incident—the creating of an incident by the correlation module 213.

The events may also contain attributes, especially the following:

the MAC address of the source/addressee;
the IP address of the source/addressee;
the type of event;
the source of the event—the event-generating module 211 which generated that event;
the IDS signature;
information from the asset management module (list of devices of the CPS);
the timeout;
the level of significance;
the list of IP addresses to be ignored;
the list of MAC addresses to be ignored.

Depending on the event attributes, the correlation module 213 in accordance with the correlation rules may request additional information from the event server 212, which in turn receives this from the event-generating module 211. For example, if an inventory module has created an event as to a change in the firmware of a controller, the correlation module 213 may request the version of the controller firmware from the inventory module. Furthermore, attributes may be contained in the predicate of transitions between nodes of the correlation rule. For example, the condition of the transition may include not only the arrival of event B after event A, but also for example the coinciding of the IP addresses of the sources where events A and B occurred (for this, the IP address in each of the transitions will be saved by the action store_attr).

An example of the use of the present system and method of correlating events to identify an information security incident are now considered.

It is assumed that the correlation module 213 has received three events A, B, C, with the time of arrival of the events coinciding. A description of the events is presented in Table 1. If the time of arrival of the events coincides, or differs by not more than a given value (such as 0.01 s), it is considered that the times of the events coincide.

TABLE 1

Example of information security events

| Event | Source | Description | Time of event | ID |
|---|---|---|---|---|
| A | White list | Unauthorized network interaction by UDP protocol | 12:49:41.499 | 2601 |
| B | IDS | IDS rule triggered: scanning of the network using TCP segments with set flag SYN | 12:49:41.499 | 3000 |
| C | Detecting and parsing module | Command detected to set current interface context | 12:49:41.499 | 2602 |

Example of the correlation rule:

```
- rule:
    name: "Rule 2"
    transitions:
    - transition:
        from: <start>
        to: step 1
        predicate:
        - event: 2601
        action:
        -ttl: 10
    - transition: # "cycle"
        from: step 1
        to: step 1
      predicate:
      - event: 2601
    - transition:
        from: step 1
        to: step 2
        predicate:
            - event: 3000
        action:
            -ttl: 10
    - transition:
        from: step 2
        to: <end>
        predicate:
            - event: 2602
        action:
            -ttl: 10
            - fire_incident:
                title: "Incident A-B-C"
```

Thus, Rule 2 contains four transitions. The first transition is from the start condition to step 1, upon receiving the event A (ID=2601). The second transition exists if several events A have been received in a row. The third transition implements a transition from step 1 to step 2 upon receiving event B (ID=3000). And the fourth transition implements a transition from step 2 to the end step upon receiving the event C (ID=2602), whereupon the incident "Incident A-B-C" is created. Moreover, a timeout of 10 seconds is established in all transitions, meaning that if the following event does not occur within 10 seconds, the chain of events will be destroyed. Thus, if event C occurs 12 seconds after event B, an incident will not be created.

Next, the following sequence of events arriving at the correlation module 213 is received:

| Event | Time of event |
|---|---|
| X1 | t0 |
| X2 | t1 |
| X3 | t2 |
| B | t3 |
| C | t3 |
| A | t3 |
| X4 | t4 |
| X5 | t4 |
| X6 | t4 |

However, it can be seen that events A, B, C are arranged in an order not agreeing with the above given rule 2. Thus, the correlation systems known from the prior art will not in the present example detect matching of the IS events with the correlation rules and will not detect IS incident in the event of a match. At the same time, both the claimed system and method of correlating information security events will detect the matching of the IS events with the correlation rules and detect the IS incident, thus improving the level of detection of information security incidents in cyber-physical systems.

Figure 3:
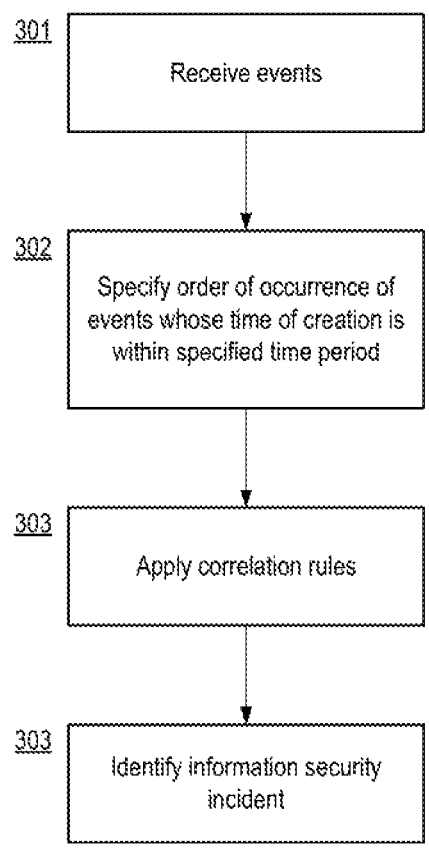
FIG. 3 shows a flow diagram of a method for correlating events to detect an information security incident, in accordance with aspects of the present disclosure.

FIG. 3 presents the method of correlating events to detect an information security incident. The method of correlation is described below on the basis of the example of the events X1, X2, X3, A, B, C, X4, X5, X6 as presented above. Thus, having received in step 301 the events X1, X2, X3, A, B, C, X4, X5, X6 from at least one event-generating module 211, the events whose time of creation lies in a given period of time (such as 0.01 s.) are identified—in this case, they are events A, B, C. Then, for these events, the correlation module 213 is used to specify at least one order of occurrence of the events (step 302).

The correlation module 213 may determine all permutations of the identified events. For example, such orders of occurrence of the events are:
1) B, A, C.
2) B, C, A.
3) A, B, C.
4) A, C, B.
5) C, A, B.
6) C, B, A.

Next, the correlation module 213 is used to apply correlation rules for the obtained events, taking into account each specified order of occurrence (step 303 in FIG. 3). In the present example, variant 3 satisfies the rule 2. Thus, variants 1-2 will be considered first, followed by variant 3. Variants 4-6 will not be considered, since variant 3 has already met the conditions of the correlation rule.

In one particular variant embodiment, at least one order of occurrence in accordance with a level of significance (severity) of each of the events whose time of creation is within the specified period of time, the level of significance being specified by the event-generating module 211. The level of significance of an event is a numerical parameter specified by the event-generating module.

Thus, the claimed method of correlating events is able to solve the stated technical problem and achieve the claimed technical result, namely, to improve the level of detection of information security incidents in cyber-physical systems.

Table 2 presents examples of correlation rules defining information security incidents such as network attack of host, breach of network policy for the host, and others.

TABLE 2

Example of correlation rules

| Rule | Name of correlation rule | Rule | Action |
|---|---|---|---|
| 1 | Network attack of host (network node) | The chain of events occurs:<br>1) unauthorized communication in the network is found (an event from the white list), at a certain IP address;<br>2) the IDS detects scanning of the network at the IP address from event 1). | Create incident |
| 2 | Compound network attack of host (network node) | The chain of events occurs:<br>1) unauthorized communication in the network is found (an event from the white list), at a certain IP address;<br>2) the IDS detects scanning of the network at the IP address from event 1);<br>3) the IDS detects attempts to exploit a network vulnerability of an object with the IP address from event 1). | Create incident |
| 3 | Breach of a technological process due to a network attack and breach of network policy | The chain of events occurs:<br>1) unauthorized communication in the network is found (an event from the white list), at a certain IP address;<br>2) the IDS detects attempts to exploit a network vulnerability of an object with the IP address from event 1);<br>3) the traffic analysis module detects a deviation of the monitored process variables from the specified values for an object with the IP address from event 1). | Create incident |
| 4 | Unauthorized control commands | The chain of events occurs:<br>1) unauthorized communication in the network is found (an event from the white list), at a certain IP address;<br>2) the monitoring and control module detects a command from the list of forbidden commands (for example, a command to update the firmware of a controller or a command to turn off a controller) for an object with the IP address from event 1). | Create incident |
| 5 | Unauthorized accessing of an external network | The event is detected:<br>1) the white list detects a network connection to an IP address from an external network | Create incident |
| 6 | Unauthorized accessing of local-area network from an external network | The event is detected:<br>1) the white list detects a network connection from an IP address from an external network | Create incident |
| 7 | Attack on the network (compound attack) | The chain of events occurs:<br>1) A network attack of the host (Rule No. 1) (network node 1)<br>2) A network attack of the host (Rule No. 1) (network node 2)<br>3) A compound network attack of the host (Rule No. 2) (network node 3)<br>4) A breach of the technological process as a result of a network attack and breach of network policy of node 4 (Rule No. 4) | Create incident |
| 8 | Penetration of the network (compound attack) | The chain of events occurs:<br>1) Unauthorized accessing of local-area network from an external network (Rule No. 6)<br>2) A breach of the technological process as a result of a network attack and breach of network policy of a node (Rule No. 3) | Create incident |
| 9 | Compound attack on technological equipment (compound attack) | The chain of events occurs:<br>1) Network attack of host (Rule No. 1)<br>2) Unauthorized control commands (Rule No. 4)<br>3) A breach of the technological process as a result of a network attack and breach of network policy (Rule No. 3) | Create incident |

The monitoring system 210 may also receive network traffic from the information system 220, which is part of the cyber-physical system 200. In this case, the network filter 201 receives the events of the network 225 of the information system 220. The information system 220 (also the corporate infrastructure) includes an aggregate of computers 221 interconnected by the computer network 225. By computers 221 it is meant in the general case any computing devices and sensors, especially personal computers, notebooks, smartphones, and also communication devices such as: routers, switches, concentrators, and others. The information system 220 may be organized using any topology of the network 225 known from the prior art, such as one of the following types: fully connected, bus, star, ring, cellular, or mixed type. On some of the computers 221 there are installed protection module 222. It should be noted that a protection module 222 might not be installed on certain of the computers 221. The information system 220 may include a targeted attack protection module 223, which may be situated for example on a separate server. A reputation server 224 may be situated in the information system 220 or in a cloud service of a service provider. It should be noted that the computer 221 may be either a physical device or a virtual machine. Proxy servers (not indicated in the figure) may be used for connecting the computers 221 by means of the network 225 to the Internet in the monitoring system 210.

The protection module 222 and, optionally, the targeted attack protection module 223 serve for the gathering of information about objects on the computer 221 and in the network 225 that is, information about IS events which are connected with those objects on the computers 221 and in the network 225, and for then sending the IS event through the network 225 to the network filter 201. In a particular embodiment, the object may be, for example, a file (a hash of that file), a process, a URL address, an IP address, a certificate, a file execution log or any other object detected on the computer 221.

In a particular embodiment, the protection modules 222-223 are used to collect in particular the following IS events:
- the behavior of processes (such as their performance track);
- events in the operating system (OS)—records of the event log of the OS;
- information about interaction between networks;
- indicators of compromise;
- verdicts of the protection modules (including fuzzy verdicts) or test signatures;
- meta-data objects, including the check sum of an object.

Figure 4:
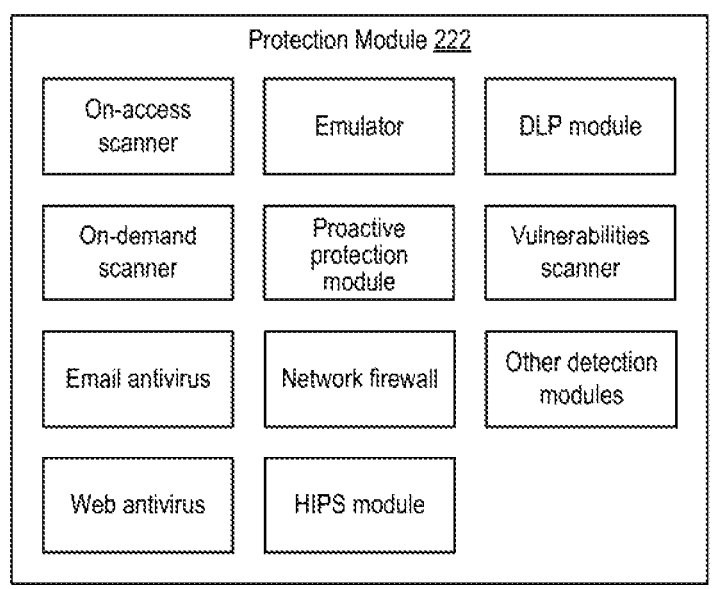
FIG. 4 shows a block diagram of a computer protection module, in accordance with aspects of the present disclosure.

The targeted attack protection module 223 is connected by means of the network 225 to the protection module 222 and performs an analysis of the network activity of the information system 220, as well as the function of detecting targeted attacks in the information system by detecting objects of computers 221 using in particular a "sandbox"—a computer environment for the safe execution of processes) and other detection technologies (see FIG. 3-4 for more details).

The targeted attack protection module 223 gathers information being sent in the network traffic. Thus, the targeted attack protection module 223 gathers information about all objects being sent through the network 225 from the computers 221, including those computers 221 on which no protection module 222 is installed.

The information about the objects in the network 225 (IS events) may include the verdicts of the targeted attack protection module 223, suspicious behavior in the network traffic, in the DNS traffic, the results of an emulation of objects from mail or the Internet.

In a particular variant embodiment, the protection modules 222-223 gather information about all the above-indicated objects. In another embodiment, the protection modules 222-223 may contain a list of safe (legitimate) objects (about which it is known for certain that they are not malicious or suspicious) and a list of malicious and suspicious objects (not shown in the figure). In this example, the protection modules 222-223 gather information not only on the objects from the list of malicious and suspicious objects, but also information on unknown objects (which are not on the list of malicious and suspicious objects, and also not on the list of safe objects).

In yet another exemplary embodiment, the protection modules 222-223 may contain a list of additional objects about which it is necessary to gather information. Such a list of objects may be generated, for example, by an administrator 226. In yet another particular exemplary embodiment, the administrator 226 may generate the list of malicious and suspicious objects and the list of safe objects, adding or removing objects from said lists.

For example, the administrator 226 may indicate a list of forbidden actions and a list of permitted actions. For example, it may be forbidden in the information system 220 to use the psexec utility on some of the computers 221, since this may be used by hackers for remote administration. Information about objects connected with the forbidden actions is gathered by the protection modules 222-223. Thus, if a use of the psexec utility is found on any computer 221 or in the network 225, information about that use will be sent to the monitoring system 210. If the protection module 223 has detected the use of the psexec utility on a computer 220 on which no protection module 222 is installed, a verification of the permissibility of using psexec on that computer may be performed by the protection module 223, if that action is not on the list of permitted actions specified by the administrator (not indicated in the figure).

FIG. 4 shows a possible example of the modules of the protection module 222. The protection module 222 may contain modules designed to ensure computer security: an on-access scanner, an on-demand scanner, an email antivirus, a web antivirus, a proactive protection module, a HIPS (Host Intrusion Prevention System) module, a DLP (data loss prevention) module, a vulnerabilities scanner, an emulator, a network firewall, and others. In a particular exemplary embodiment, these modules may be a component of the protection module. In yet another exemplary embodiment, these modules may be realized as separate software components.

The on-access scanner contains a functionality for detecting malicious activity of all files being opened, launched, and saved on the computer system of the user. The on-demand scanner differs from the on-access scanner in that it scans files and directories specified by the user on the demand of the user.

The email antivirus is needed to monitor incoming and outgoing email for containing malicious objects. The web antivirus is configured for preventing the execution of malicious code which might be found on web sites when visited by the user, and also for blocking the opening of web sites. The HIPS module is configured for detecting unwanted and malicious activity of programs and for blocking this at the time of execution. The DLP module is configured for detecting and preventing leakage of confidential data outside the computer or network. The vulnerabilities scanner is needed to detect vulnerabilities on the computer (for example, certain components of the protection module have been switched off, obsolete virus databases, a network port has been closed, and so on). The network firewall monitors and filters network traffic in accordance with given rules. The working of the emulator is to simulate a guest system during the execution of code in the emulator. The proactive protection module uses behavioral signatures to detect behavior of executable files and to classify them by level of trust.

These modules, upon detecting malicious software (suspicious behavior, spam, and other signs of a computer threat), create a corresponding notification (which may then be turned into a verdict of the protection module), informing the protection module of the detected threat and the need to take action to eliminate the threat (for example, to remove or modify a file, forbid execution, and so on). In a particular exemplary embodiment, the actual module which has detected the malicious software may perform the actions to eliminate the threat. In yet another example, the verdict may be a fuzzy or test verdict (since the verdict may produce false positives)—in this case the protection module will not perform the actions to eliminate the threat, but will send the notification onward, to the event-generating module 211. It should be noted that a verdict of the protection module is part of the information about the object (file, process), which will then be sent to the event-generating module 211, which will generate the corresponding IS events.

Figure 5:
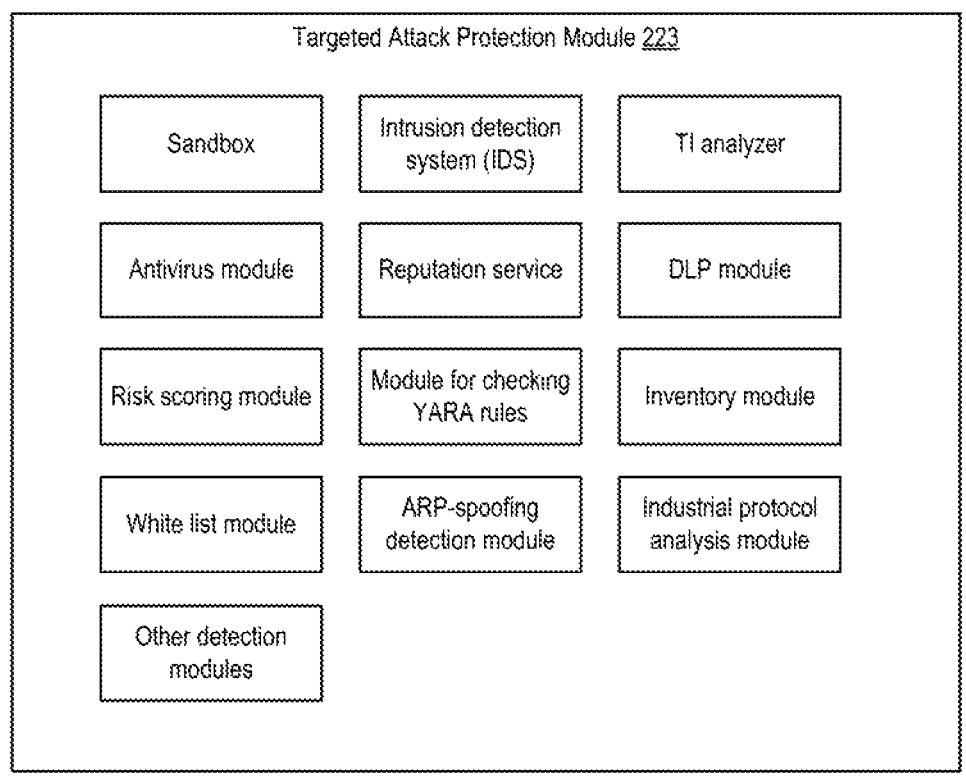
FIG. 5 shows a block diagram of a module for protection against targeted attacks, in accordance with aspects of the present disclosure.

FIG. 5 shows one possible example of the targeted attack protection module 223, in particular a "sandbox", the Intrusion Detection System (IDS), the reputation service, the module for checking of YARA rules, and other detection modules.

The sandbox module has a functionality analogous to the emulator of the protection module of a computer with the difference that the sandbox can utilize additional computing capabilities and work for a longer time.

The sandbox is a computer environment for the safe execution of processes and is configured for identifying suspicious activity in the execution of a process launched from a file.

The sandbox may be realized for example in the form of a virtual machine, on the basis of a partial virtualization of the file system and registry, on the basis of access rules to the file system and registry, or on the basis of a mixed protocol.

The intrusion detection system is a means of detecting an unauthorized access to the cyber-physical system 100 or network 201 or unauthorized control of them.

The reputation server contains information about the popularity of objects on the computers (the number of computers on which the object is present, the number of launches of the object, etc.).

The module for checking YARA rules is configured for checking YARA signatures an open format of signatures.

The DLP module is configured for detecting and preventing leakage of confidential data outside the computer or network.

The TI (threat intelligence) analyzer is a module which associates objects from reports on computer attacks with information about the objects and with features of suspicious behavior. For example, the TI analyzer may determine a list of IP addresses of command centers participating in known computer attacks. The TI analyzer sends the obtained information to a scoring module, which ranks the information about the objects and the features of suspicious behavior by a probability of their belonging to a computer attack.

Figure 6:
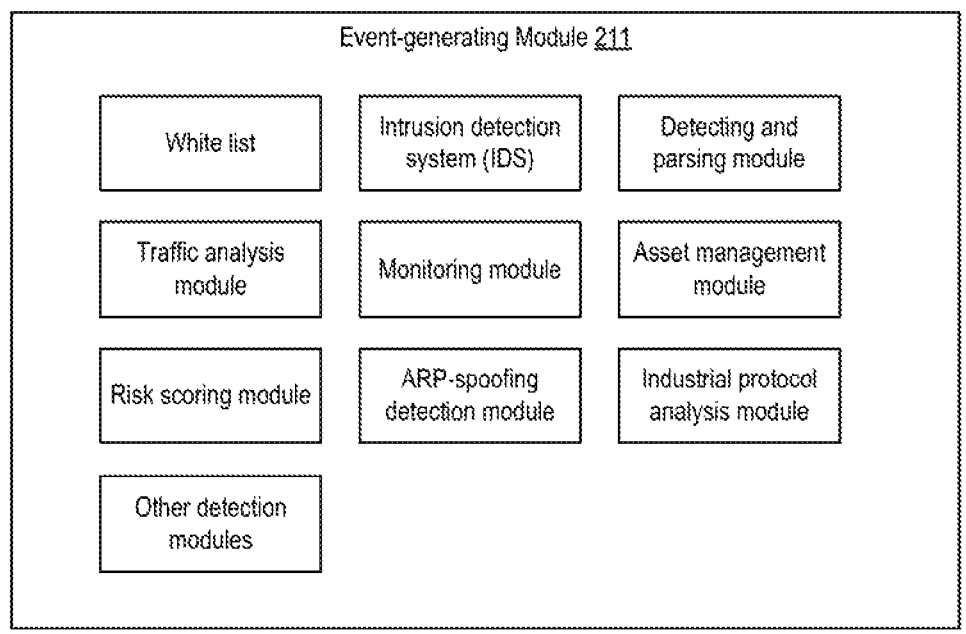
FIG. 6 shows a block diagram of an event-generating module, in accordance with aspects of the present disclosure.

FIG. 6 shows examples of event-generating module 211. The white list registers all network communications not contained in white lists (that is, the list of authorized ones). Thus, upon detecting an unauthorized network connection, the white list creates an event of unauthorized network connection and sends it to the event server 212.

The intrusion detection system (IDS) analyzes the network activity and compares it to patterns of known computer attacks. In the event of a match, a corresponding event is created for the event server 212. For example: an accessing of IP addresses of the command center of a hacker.

The traffic analysis module performs an analysis of statistical data, and a checking and filtering of network packets for their content. The analysis may be performed, for example, using DPI (deep packet inspection) technology, which is a technology for gathering statistical data and checking and filtering of network packets for their content. An IS event may be created in event of detecting uncharacteristic, suspicious packets in the network, such as commands to update the firmware of a microcontroller of any PLC or sensor, the passing of a given threshold by a process variable of a sensor, and so forth.

The detecting and parsing module is configured for detecting and parsing the specialized network protocols for control of the industrial protocols.

The asset management module is configured for detecting and monitoring information about the equipment operating in the industrial network. For example, if a new device has been registered in the network, a corresponding IS event will be created. If any device has been lost from the network, an IS event will also be created (for example, a sensor or controller is disconnected). Other examples of events might be, for example, a change of manufacturer of the firmware of a controller.

The ARP-spoofing detection module serves to detect computer attacks directed at vulnerability in the APR protocol and especially the Ethernet.

Figure 7:
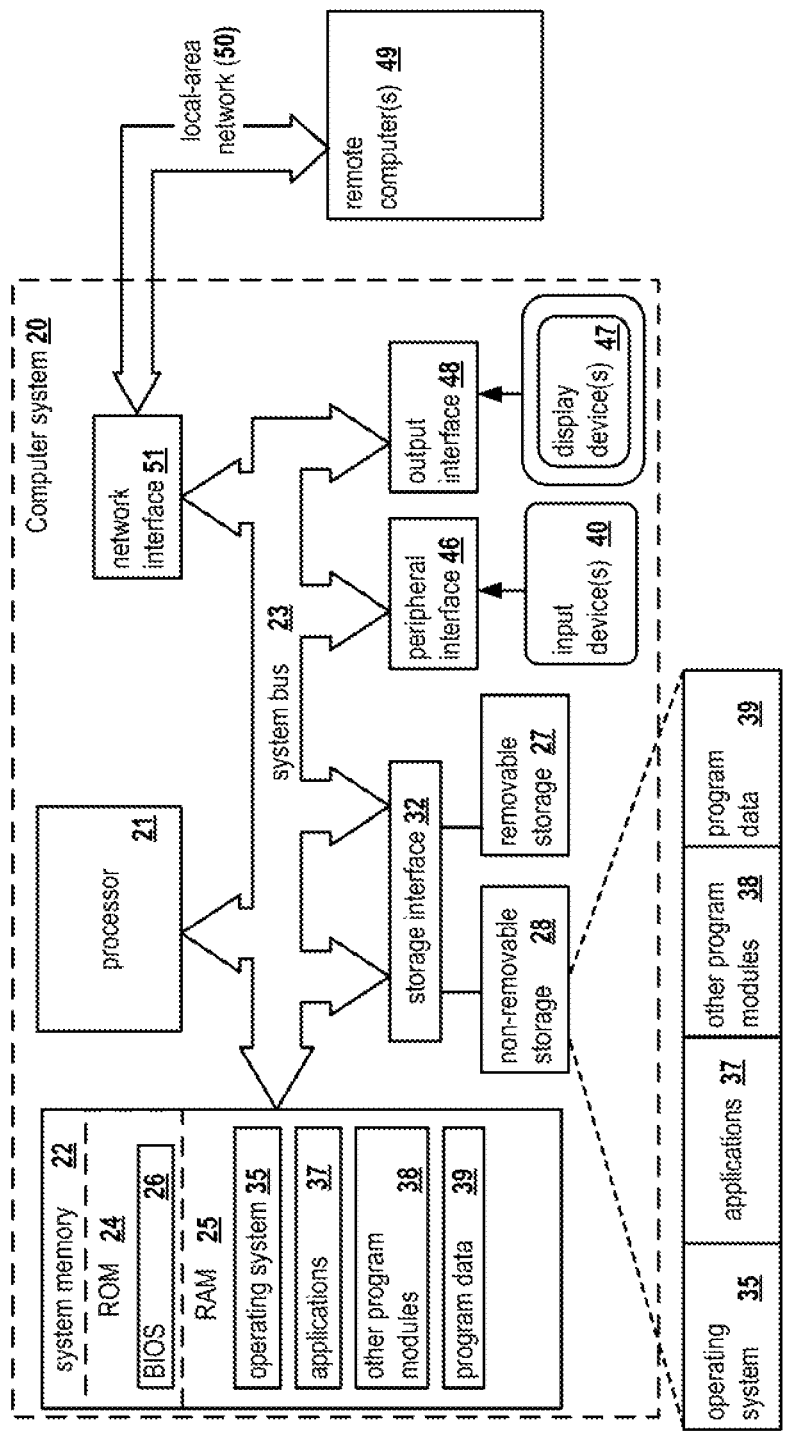
FIG. 7 presents an example of a general-purpose computer system on which aspects of the present disclosure can be implemented.

FIG. 7 is a block diagram illustrating a computer system 20 on which aspects of systems and methods for correlating events to detect an information security incident may be implemented in accordance with an exemplary aspect. The computer system 20 can be implemented as system 100, 200, monitoring system 210, information system 220, etc., and may be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM)

25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for correlating events to detect an information security incident, the method comprising:
   receiving a plurality of network events indicating potential security violations, wherein each network event of the plurality of network events has a respective timestamp;
   identifying, from the plurality of network events, a subset of network events that have occurred within a period of time, based on each respective timestamp;
   determining a plurality of potential orders of occurrence for the subset of network events;
   applying at least one correlation rule to each respective potential order of the plurality of potential orders, wherein the at least one correlation rule comprises at least one network event order of occurrence associated with the information security incident; and
   in response to determining that the at least one correlation rule is fulfilled, detecting the information security incident,
   wherein the events occurring within the period of time are considered coinciding and are received from plurality of source devices that are not synchronized.

2. The method of claim 1, wherein a length of the period of time is less than a minimum amount of time between consecutive network events needed to determine an accurate order of occurrence of the consecutive network events.

3. The method of claim 1, wherein the plurality of events are received from a plurality of source devices such that at least a first event of the plurality of events is received from a first source device of the plurality of source devices and at least a second event of the plurality of events is received from a second source device of the plurality of source devices.

4. The method of claim 3, wherein an event detection speed of the first source device is less than an event detection speed of the second source device.

5. The method of claim 1, wherein determining that the at least one correlation rule is fulfilled comprises:
   comparing the at least one network event order of occurrence to each respective potential order; and
   determining, based on the comparing, a match between the at least one network event order of occurrence and at least one potential order.

6. The method of claim 1, further comprising not detecting the information security incident, in response to determining that the at least one correlation rule is not fulfilled by any of the plurality of potential orders.

7. A system for correlating events to detect an information security incident, the system comprising a hardware processor configured to:
   receive a plurality of network events indicating potential security violations, wherein each network event of the plurality of network events has a respective timestamp;
   identify, from the plurality of network events, a subset of network events that have occurred within a period of time based on each respective timestamp;
   determine a plurality of potential orders of occurrence for the subset of network events;
   apply at least one correlation rule to each respective potential order of the plurality of potential orders, wherein the at least one correlation rule comprises at least one network event order of occurrence associated with the information security incident; and
   in response to determining that the at least one correlation rule is fulfilled, detect the information security incident,
   wherein the events occurring within the period of time are considered coinciding and are received from plurality of source devices that are not synchronized.

8. The system of claim 7, wherein a length of the period of time is less than a minimum amount of time between consecutive network events needed to determine an accurate order of occurrence of the consecutive network events.

9. The system of claim 7, wherein the plurality of events are received from a plurality of source devices such that at least a first event of the plurality of events is received from a first source device of the plurality of source devices and at least a second event of the plurality of events is received from a second source device of the plurality of source devices.

10. The system of claim 9, wherein an event detection speed of the first source device is less than an event detection speed of the second source device.

11. The system of claim 7, wherein the hardware processor is configured to determine that the at least one correlation rule is fulfilled by:
   comparing the at least one network event order of occurrence to each respective potential order; and
   determining, based on the comparing, a match between the at least one network event order of occurrence and at least one potential order.

12. The system of claim 7, wherein the hardware processor is configured to not detect the information security incident, in response to determining that the at least one correlation rule is not fulfilled by any of the plurality of potential orders.

13. A non-transitory computer readable medium storing thereon computer executable instructions for correlating events to detect an information security incident, comprising instructions for:
- receiving a plurality of network events indicating potential security violations, wherein each network event of the plurality of network events has a respective timestamp;
- identifying, from the plurality of network events, a subset of network events that have occurred within a period of time, based on each respective timestamp;
- determining a plurality of potential orders of occurrence for the subset of network events;
- applying at least one correlation rule to each respective potential order of the plurality of potential orders, wherein the at least one correlation rule comprises at least one network event order of occurrence associated with the information security incident; and
- in response to determining that the at least one correlation rule is fulfilled, detecting the information security incident,
- wherein the events occurring within the period of time are considered coinciding and are received from plurality of source devices that are not synchronized.

14. The non-transitory computer readable medium of claim 13, wherein a length of the period of time is less than a minimum amount of time between consecutive network events needed to determine an accurate order of occurrence of the consecutive network events.

15. The non-transitory computer readable medium of claim 13, wherein the plurality of events are received from a plurality of source devices such that at least a first event of the plurality of events is received from a first source device of the plurality of source devices and at least a second event of the plurality of events is received from a second source device of the plurality of source devices.

16. The non-transitory computer readable medium of claim 15, wherein an event detection speed of the first source device is less than an event detection speed of the second source device.

17. The non-transitory computer readable medium of claim 13, wherein the instruction for determining that the at least one correlation rule is fulfilled comprises further instructions for:
- comparing the at least one network event order of occurrence to each respective potential order; and
- determining, based on the comparing, a match between the at least one network event order of occurrence and at least one potential order.

* * * * *